US010940920B2

(12) United States Patent
Nielsen et al.

(10) Patent No.: US 10,940,920 B2
(45) Date of Patent: Mar. 9, 2021

(54) COLLAPSIBLE FAIRING

(71) Applicant: PGS Geophysical AS, Oslo (NO)

(72) Inventors: Einar Nielsen, Oslo (NO); Karl Petter Elvestad, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 16/555,500

(22) Filed: Aug. 29, 2019

(65) Prior Publication Data

US 2019/0382084 A1 Dec. 19, 2019

Related U.S. Application Data

(62) Division of application No. 15/753,648, filed as application No. PCT/EP2016/069694 on Aug. 19, 2016, now Pat. No. 10,427,759.

(60) Provisional application No. 62/210,052, filed on Aug. 26, 2015.

(30) Foreign Application Priority Data

Aug. 19, 2016 (WO) ................ PCT/EP2016/069694

(51) Int. Cl.
*F15D 1/10* (2006.01)
*B63B 21/66* (2006.01)
*G01V 1/38* (2006.01)
*G01V 1/20* (2006.01)

(52) U.S. Cl.
CPC ............ *B63B 21/663* (2013.01); *B63B 21/66* (2013.01); *G01V 1/3826* (2013.01); *B63B 2211/02* (2013.01); *F15D 1/10* (2013.01); *G01V 2001/207* (2013.01)

(58) Field of Classification Search
CPC ... B63B 21/66; B63B 21/663; B63B 2021/66; B63B 2708/00; B63B 2211/02; G01V 2001/207; G01V 1/3826; F15D 1/00; F15D 1/10
USPC ........................................................ 114/243
See application file for complete search history.

(56) References Cited

U.S. PATENT DOCUMENTS

| 3,194,204 | A | * | 7/1965 | Nichols | ................. | B63B 21/663 |
| | | | | | | 114/243 |
| 4,726,314 | A | | 2/1988 | Ayers et al. | | |
| 5,738,034 | A | * | 4/1998 | Wolff | ................... | B63B 21/502 |
| | | | | | | 114/243 |
| 5,984,584 | A | * | 11/1999 | McMillan | ............... | E21B 17/01 |
| | | | | | | 114/243 |
| 6,415,730 | B1 | | 7/2002 | Barker et al. | | |

(Continued)

FOREIGN PATENT DOCUMENTS

| GB | 2499397 | 8/2013 |
| KR | 20120083751 | 7/2012 |

OTHER PUBLICATIONS

Hafen, et al., "Cable Strumming Suppression", Civil Engineering Laboratory, Technicial Note No. N-1499, Sep. 1977 (107 pgs) http://www.dtic.mil/dtic/tr/fulltext/u2/a047996.pdf.

(Continued)

*Primary Examiner* — Daniel V Venne

(57) ABSTRACT

A system can include a float, a winch, a line, and a collapsible fairing. The winch can be coupled to the float. The line can be associated with the winch, where the winch is configured to extend and retract the line. The collapsible fairing can surround the line. Extension and retraction of the line can cause the collapsible fairing to extend and collapse.

18 Claims, 5 Drawing Sheets

(56) References Cited

U.S. PATENT DOCUMENTS

| | | | |
|---|---|---|---|
| 8,826,842 | B2 | 9/2014 | Hinrichs |
| 9,011,045 | B2* | 4/2015 | Muniz-Martinez ........................ E21B 17/012 405/211 |
| 9,075,165 | B2 | 7/2015 | Vageskar et al. |
| 2004/0013041 | A1 | 1/2004 | Bouyoucos et al. |
| 2008/0166185 | A1* | 7/2008 | Baugh ................... B63B 21/502 405/195.1 |
| 2009/0212594 | A1 | 8/2009 | Breidenbach |
| 2011/0007603 | A1 | 1/2011 | Frivik et al. |
| 2011/0158045 | A1 | 6/2011 | Karlsen |
| 2014/0010044 | A1 | 1/2014 | Hovland et al. |
| 2014/0247691 | A1 | 9/2014 | Martin |
| 2016/0202378 | A1* | 7/2016 | Ridsdill-Smith ...... G01V 1/133 367/21 |

OTHER PUBLICATIONS

"Fairwrap Cable Fairing", Specialty Devices, Inc., 2014, http://specialtydevices.com/index/wp-content/uploads/2014/04/Fairwrap-2014.pdf (3 pgs).

International Search and Written Opinion for related for PCT Application PCT/EP2016/069694, dated Nov. 21, 2016 (15 pgs).

International Preliminary Report on Patentability for related for PCT Application PCT/EP2016/069694, dated Mar. 8, 2018 (11 pgs).

\* cited by examiner

COLLAPSIBLE FAIRING

CROSS-REFERENCE TO RELATED APPLICATIONS

This application claims priority to U.S. 371 application Ser. No. 15/753,648 filed on Feb. 20, 2018, published as U.S. Publication No. 2018-0237109 A1 on Aug. 23, 2018, and granted as U.S. Pat. No. 10,427,759 on Oct. 1, 2019, which claims priority to International Application No. PCT/EP2016/069694, filed on Aug. 19, 2016 and published as WO 2017/032708 on Mar. 2, 2017, which claims the benefit of U.S. Provisional Application 62/210,052, filed Aug. 26, 2015, all of which are incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface of the water and over a subterranean formation to be surveyed for mineral deposits. Receivers may be located on or near the seafloor, on one or more streamers towed by the marine survey vessel, or on one or more streamers towed by another vessel.

The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source. The receivers, sources, or additional survey equipment can be pulled through the water using lines such as cables, ropes, strings, cords, wires, etc. The lines can cause drag on the equipment as the lines are pulled through the water, thereby reducing efficiency of the system.

DETAILED DESCRIPTION

Figure 1:
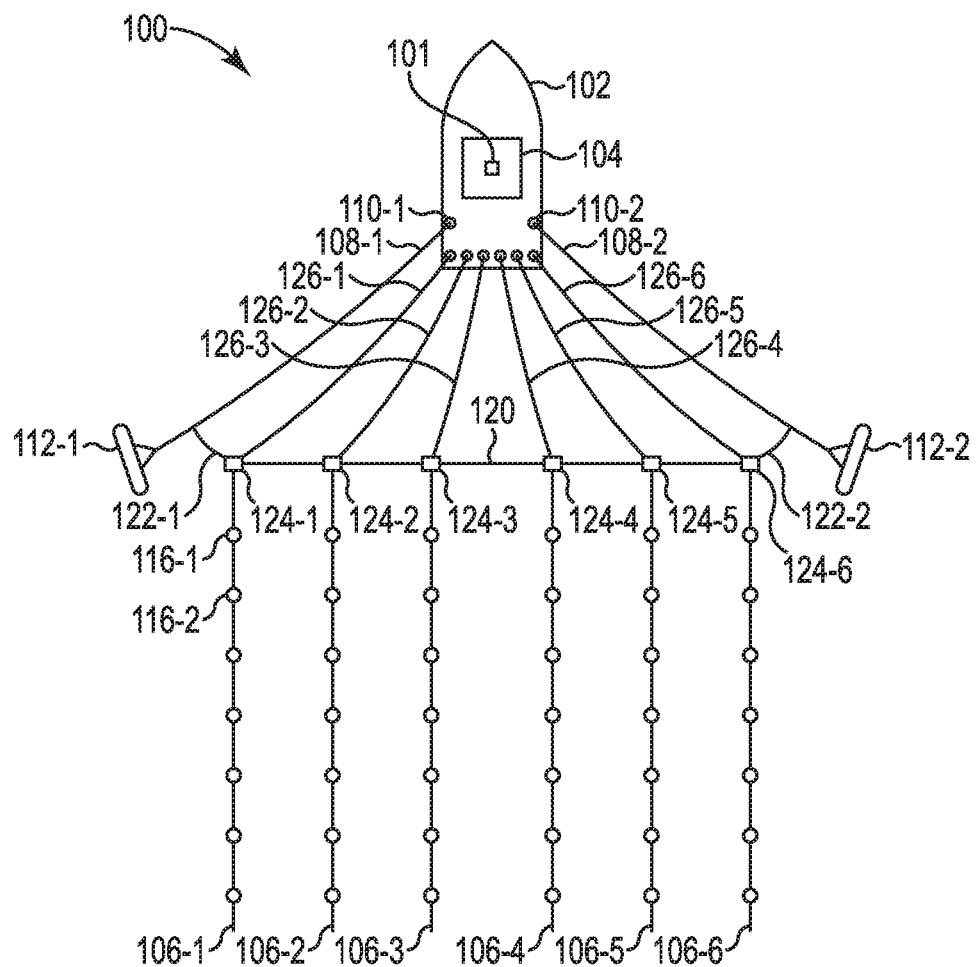
FIG. 1 illustrates an overhead view of a marine survey system.

The present disclosure is related generally to the field of marine surveying. Marine surveying can include, for example, seismic or electromagnetic surveying, among others. For example, this disclosure may have applications in marine surveying, in which one or more sources are used to generate wavefields, and receivers—either towed or ocean bottom—receive energy generated by the sources and affected by the interaction with the subsurface formation. In particular, the present disclosure is related to a collapsible fairing for lines. A line is a cylindrical flexible strand (or strands such as braided strands) of material that can be used in a marine environment. Examples of lines include cables, ropes, strings, cords, wires, etc. Lines can be made of metal, alloy, or any long, stringy, fibrous material including natural or synthetic fibers such as hemp, polypropylene, nylon, polyesters, aramids, and acrylics.

A towed object, such as a source, a receiver, or a streamer, may be towed behind a marine survey vessel. A streamer is a marine cable assembly that can include receivers and electrical or optical connections to transmit information collected by the receivers to the marine survey vessel. The streamer can include receivers such seismic receivers (e.g., hydrophones, geophones, etc.) or electromagnetic receivers. Marine surveys employing towed objects may involve the use of a float to provide buoyancy or steering control for the towed object. The towed object can be at least partially supported by the buoyancy of the float holding the towed object a particular distance from the surface of the water via a line between the towed object and the float. In at least one embodiment of the present disclosure, a float can include a winch coupled to the line. The winch can extend and retract the line to lower and raise the towed object between the float and the seafloor. For example, the winch can retract the line to raise a towed object coupled to the line closer to the water surface or the winch can extend the line to be extended and lower the towed object further from the water surface and closer to the seafloor. According to some previous approaches, such a line may suffer from strumming or drag when being towed behind a marine survey vessel. According to at least one embodiment of the present disclosure, a collapsible fairing can surround the line to reduce such strumming or drag when moving through the water, such as when being towed through the water by a marine survey vessel. As opposed to a sectional fairing that necessitates the addition or removal of sections of the sectional fairing to the line as it is extended or retracted, the collapsible fairing does not require additional sections or labor.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. The term "or" should be read to mean "inclusive or" (e.g., "and/or") unless the context clearly indicates that the term "or" means "exclusive or."

The figures herein follow a numbering convention in which the first digit or digits correspond to the drawing figure number and the remaining digits identify an element or component in the drawing. Similar elements or components between different figures may be identified by the use of similar digits. For example, 334 may reference element "34" in FIG. 3A, and a similar element may be referenced as 434 in FIG. 4A. As will be appreciated, elements shown herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an overhead view of a marine survey system 100. FIG. 1 illustrates a marine survey vessel 102 having onboard equipment 104, such as navigation, source control, and data recording equipment. The onboard equipment 104 can include an electronic controller 101 for winches (e.g., winch 236 illustrated in FIG. 2), although in at least one embodiment, each winch can have its own electronic controller located on the winch itself. For embodiments in which the electronic controller 101 is on the onboard equipment 104 or on both the onboard equipment 104 and on the winch, control can be provided between the marine survey vessel 102 and the winch in a wired or wireless fashion. For example, an electronic controller on the winch can receive control signals from the marine survey vessel 102 via wireless transmission.

The marine survey vessel 102 is configured to tow one or more towed objects. Towed objects are generally illustrated herein as streamers, however embodiments are not so limited, as the towed objects can be sources, receivers, or other objects towed by the marine survey vessel 102. The marine survey vessel 102 can be configured to tow towed objects 106-1, 106-2, 106-3, 106-4, 106-5, 106-6, referred to generally as towed objects 106, through water. While FIG. 1 shows six towed objects 106, embodiments are not so limited and any number of towed objects may be used. The towed objects 106 can be coupled to towing equipment that maintains the towed objects 106 at selected depth and lateral positions with respect to each other and with respect to the marine survey vessel 102. For example, the towing equipment can comprise a first paravane tow line 108-1 coupled to the marine survey vessel 102 by way of a first onboard winch 110-1 and a second paravane tow line 108-2 coupled to the marine survey vessel 102 by way of a second onboard winch 110-2. The first paravane tow line 108-1 and the second paravane tow line 108-2 are referred to generally as paravane tow lines 108. The first onboard winch 110-1 and the second onboard winch 110-2 are referred to generally as onboard winches 110. The onboard winches 110 enable changing the deployed length of each paravane tow line 108. The second end of a first paravane tow line 108-1 can be coupled to a first paravane 112-1, and the second end of a second paravane tow line 108-2 can be coupled to second paravane 112-2, referred to generally as paravanes 112. In each case, the tow lines 108 can be coupled to their respective paravanes 112 through respective set of lines called a "bridle." The paravanes 112 are each configured to provide a lateral force component to the various elements of the marine survey system when the paravanes 112 are towed in the water. The combined lateral forces of the paravanes 112 separate the paravanes 112 from each other constrained by one or more spreader lines 120 coupled between the paravanes 112. The paravanes 112 can be coupled directly to the spreader line 120, or as illustrated, coupled to the spreader line 120 by way of a first spur line 122-1 and a second spur line 122-2.

The towed objects 106 can each be coupled, at the ends nearest the marine survey vessel 102 (i.e., the proximal ends) to a respective lead-in line termination 124-1, 124-2, 124-3, 124-4, 124-5, 124-6, referred to generally as lead-in line terminations 124. The lead-in line terminations 124 can be coupled to or are associated with the spreader lines 120 so as to control the lateral positions of the towed objects 106 with respect to each other and with respect to the marine survey vessel 102. Electrical or optical connections between the appropriate components in the onboard equipment 104 and the receivers, such as receivers 116-1 and 116-2, in the towed objects 106 may be made using lead-in lines 126-1, 126-2, 126-3, 126-4, 126-5, 126-6, referred to generally as lead-in lines 126. Much like the tow lines 108 associated with respective onboard winches 110, each of the lead-in lines 126 may be deployed by a respective onboard winch such that the deployed length of each lead-in line 126 can be changed. Although not illustrated in FIG. 1 due to perspective, each towed object 106 can be coupled to one or more floats by respective lines surrounded by respective collapsible fairings as described in more detail herein.

Figure 2A:
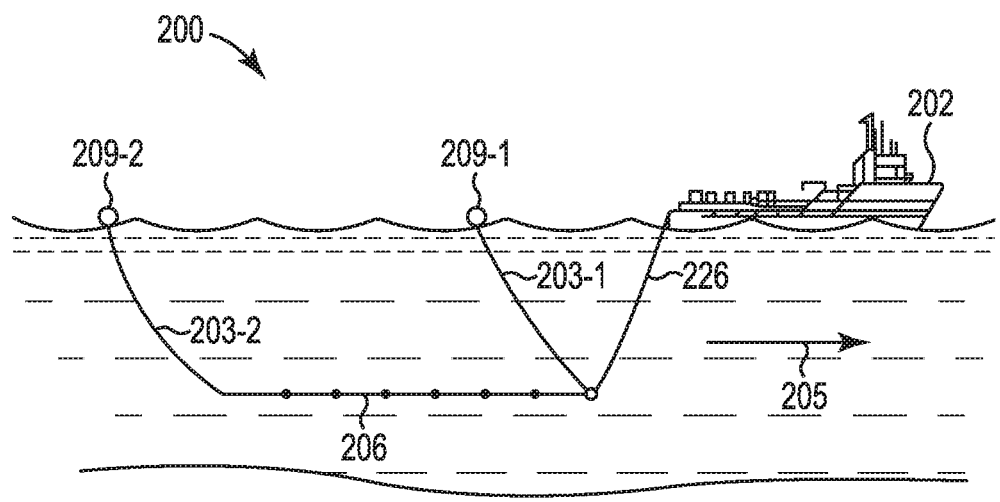
FIG. 2A illustrates a side elevation view of a marine survey system according to some previous approaches.

FIG. 2A illustrates a side elevation view of a marine survey system 200 according to some previous approaches. As illustrated in FIG. 2A, only a single lead-in line 226 and towed object 206 are shown. However, additional equipment in the form of a first line 203-1 coupled to a first float (illustrated as lead buoy 209-1), as well as a second line 203-2 coupled to a second float (illustrated as tail buoy 209-2). The first line 203-1 and the second line 203-2 are referred to generally as lines 203. The marine survey vessel 202 can move in a direction of travel 205 towing the various lines. The towed object 206 can be oriented parallel to the direction of the travel 205, and present a relatively small amount of drag. However, the other lines, such as the lead-in line 226 and the lines 203 can be oriented in the water so as to present significantly more surface area to the direction of travel, and thus more drag. Although only two floats are illustrated in association with the towed object 206, various systems can include more or fewer floats per towed object 206.

In at least one embodiment, the lines 203 can have a circular cross section, which from a hydrodynamic standpoint can be less than optimal. Each of the lines 203 and the lead-in line 226 can be subject to "strumming" during towing. Strumming can refer to relatively small amplitude, high-frequency vibrations of a line due to periodic lift forces induced by vortex shedding. Vortex shedding can refer to oscillating flow caused by water flowing past a bluff body such as a body with a circular cross section.

However, according to at least one embodiment of the present disclosure, in order to at least partially reduce drag or vortex shedding, some or all of the lines 203 or the lead-in line 226 may be surrounded by a respective collapsible fairing. The collapsible fairing can change the shape presented to the direction of travel 205 to a more favorable hydrodynamic shape as illustrated and described in more detail below.

Figure 2B:
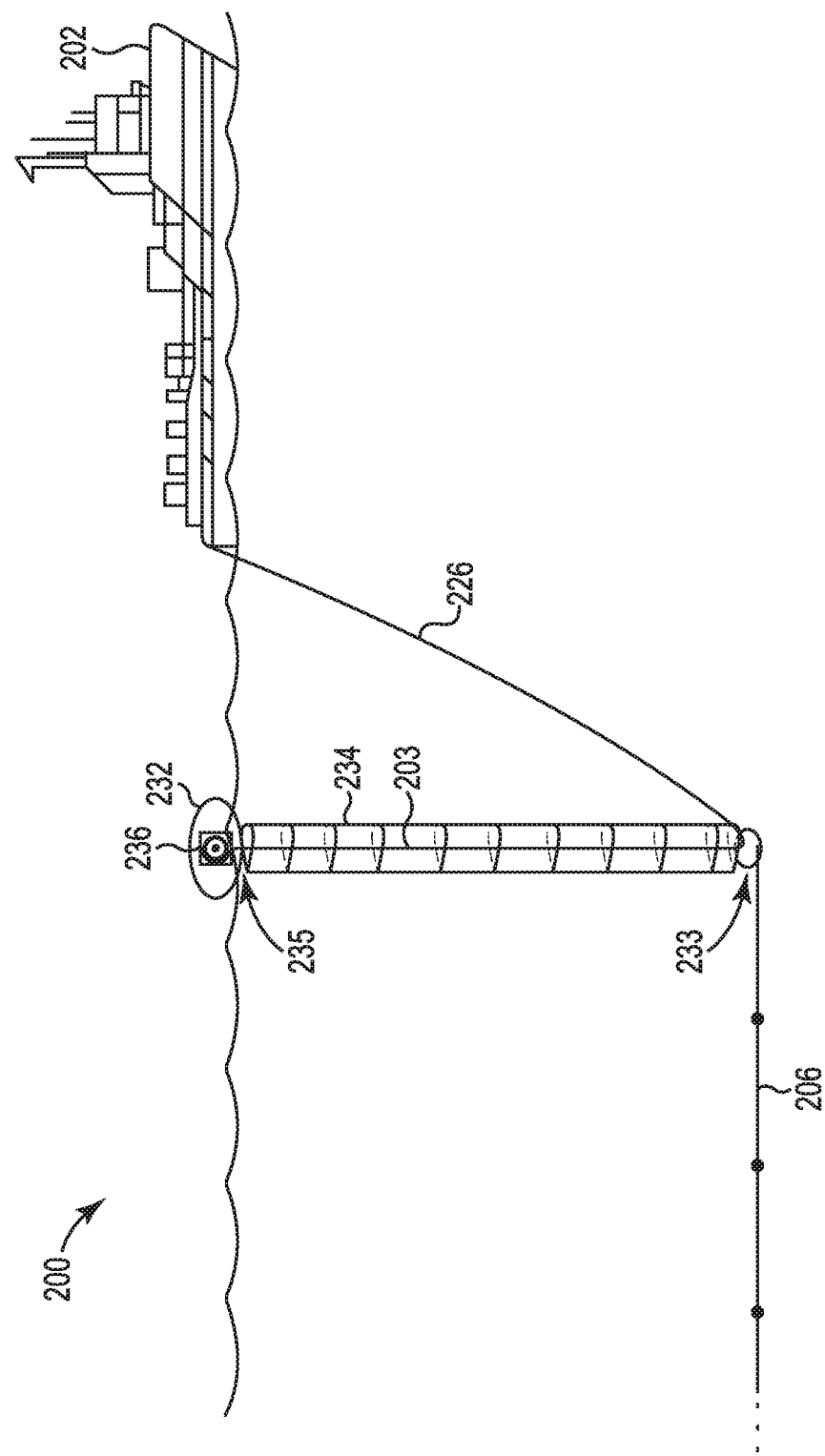
FIG. 2B illustrates a side elevation view of a marine survey system according to at least one embodiment of the present disclosure.

FIG. 2B illustrates a side elevation view of the marine survey system 200 according to at least one embodiment of the present disclosure. The marine survey system 200 can be analogous to the marine survey system 100 illustrated in FIG. 1. The marine survey system 200 can include a marine survey vessel 202. The marine survey vessel 202 can be coupled to a towed object 206, such as a streamer, and a line 203. A float 232 can be coupled to the towed object 206 by way of the line 203. The float 232 can be an object having a buoyancy such that it remains at or near the surface of water. An example of a float is a buoy.

The line 203 can be extended outward from and retracted inward toward the float 232 by way of a winch 236 coupled to the float 232. In at least one embodiment, the winch 236 can be housed within the float 232. In at least one embodiment, the winch 236 can be coupled to the float 232 externally to the float 232. The winch 236 can turn a particular direction to extend the line 203 and turn a different direction than the particular direction to retract the line 203. For example, the winch 236 can rotate clockwise to extend the line 203 and rotate counterclockwise to retract the line 203, or vice versa. The winch 236 can be motorized such that power is applied to turn the winch 236. The winch 236 can include a reel or pulley over which the line 203 can be spooled. As the line 203 is retracted, the towed object 206 can be pulled closer to the float 232 and therefore closer to the surface of the water. In one embodiment, retracting the line 203 includes retracting the line 203 without removing sections of the collapsible fairing 234. As the line 203 is extended, the towed object 206 can be lowered further from the float 232 and therefore deeper into the water and further from the surface of the water. That is, extending the line 203 causes a collapsible fairing 234, for example, to extend away from a water surface. The towed object can be moved further from the water surface in a direction non-parallel to a direction of travel of the marine survey vessel 102. The line 203 can be of any length. By way of example, the line 203 can be extended to a length between 20-25 meters. The winch 236 is not limited to the winding spool described herein and can include other devices that can extend and retract the line 203.

The line 203 can be surrounded by a fairing 234 that is collapsible. In at least one embodiment, the collapsible fairing 234 can have a tube construction, which can be a compressible tube or a telescoping tube. In at least one embodiment, the collapsible fairing 234 can be an accordion-like fairing as described in more detail with respect to FIG. 3B. In at least one embodiment, the collapsible fairing 234 can be similar to a spiral air-duct construction as described in more detail with respect to FIG. 3C. In at least one embodiment, the collapsible fairing 234 can have a foil shaped cross section that is designed to reduce drag in the water as described in more detail with respect to FIG. 3D. In at least one embodiment, the collapsible faring 234 can have a diamond shaped cross section as described in more detail with respect to FIG. 3E.

A top of the collapsible fairing 234 can be coupled to the float 232, as shown at 235. However, in at least one embodiment, the collapsible fairing 234 may not be coupled to the float 234. Rather, the top of the collapsible fairing 234 can contact the float 234 without being coupled thereto. A bottom of the collapsible fairing 234 can be coupled to the line 203, as shown at 233. However, in at least one embodiment, the bottom of the collapsible fairing 234 may not be coupled to the line 203. Rather, the bottom of the collapsible fairing 234 may contact the towed object 206 or an attachment to the towed object 206 rather than being coupled to the line 203.

The marine survey vessel 202 can tow a towed object 206. The towed object 206 can be at least partially supported by the float 232. For example, the towed object 206 can be at least partially supported by the float via the line 203 or the collapsible fairing 234. The line 203 can be extended from the float 232 via the winch 236 coupled to the float 232. The line 203 can be surrounded by the collapsible fairing 234 extending between the float 232 and the towed object 206 both before and after the line 203 is extended. When the line 203 is retracted via the winch 236, the collapsible fairing 234 can collapse and remain positioned between the float 232 and the towed object 206 before, during, and after extension of the line 203 such that the collapsible fairing 234 does not wind over the winch 236. When the line 203 is extended via the winch 236, the collapsible fairing 234 can extend and remain positioned between the float 232 and the towed object 206. When the line 203 extends from the winch 236, the collapsible fairing 234 can extend and make a foil, such as a continuous foil, over the desired length of the line 203.

Figure 3A:
FIG. 3A illustrates a fully collapsed collapsible fairing.

FIG. 3A illustrates a collapsible fairing 334 that is fully collapsed. The collapsible fairing 334 is analogous to the collapsible fairing 334 illustrated in FIG. 2B. A fully collapsed length 305 of the collapsible fairing 334 is illustrated in FIG. 3A. The collapsible faring 334 being fully collapsed means that the collapsible fairing 334 is in its shortest intended length. For example, at the fully collapsed length 305, further collapsing (e.g., compressing) of the collapsible fairing 334 may cause damage to the collapsible fairing 334. The line (e.g., the line 203 illustrated and described with respect to FIG. 2B) can have a length corresponding to the fully collapsed length 305 of the collapsible fairing 334 that may be referred to as non-windable by the winch (e.g., the winch 236 illustrated in FIG. 2B). For example, the fully collapsed length 305 can be a length of two meters.

Figure 3B:
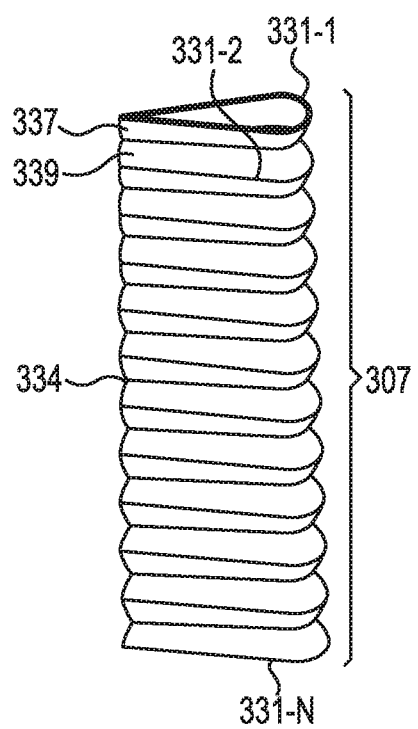
FIG. 3B illustrates a fully extended collapsible fairing having a plurality of parallel ridges.

FIG. 3B illustrates a fully extended collapsible fairing 334 having a plurality of parallel ridges 331-1, 331-2, . . . , 331-N. The parallel ridges 331-1, 331-2, . . . , 331-N are generally referred to as parallel ridges 331. The parallel ridges 331 are referred to as "parallel" because they each have a plane that is parallel to other ridges of the collapsible fairing 334. Furthermore, the parallel ridges 331 do not intersect with each other. A fully extended length 307 of the collapsible fairing 334 is illustrated in FIG. 3B. The collapsible faring 334 being fully extended means that the collapsible fairing 334 is in its longest intended length. For example, at the fully extended length 307, further extending (e.g., stretching) of the collapsible fairing 334 may cause damage to the collapsible fairing 334. The line (e.g., the line 203 illustrated and described with respect to FIG. 2B) can have a length corresponding to the fully extended length 307 of the collapsible fairing 334. For example, the fully extended length 307 can be a length of twenty meters.

In at least one embodiment, the collapsible fairing 334 can be an accordion-like fairing that is extendible and collapsible. Each portion or section of the accordion-like fairing can collapse or fold to decrease a length of the fairing as it is collapsed and increase a length of the fairing as it is extended. The plurality of parallel ridges 331 can maintain a shape, such as a foil shape, of the collapsible fairing 334. Adjacent parallel ridges 331, such as ridge 331-1 and ridge 331-2, can be coupled by respective upper and lower sheets, such as upper sheet 337 and lower sheet 339. The upper sheets 337 and lower sheets 339 can have a diameter that mirrors the shape of the collapsible fairing 334 and decreases as the upper sheets 337 and lower sheets 339 extend away from the parallel ridges 331. The upper sheets 337 can be coupled to the lower sheets 339 such that the upper sheets 337 and the lower sheets 339 fold together as the collapsible fairing 334 collapses.

Figure 3C:
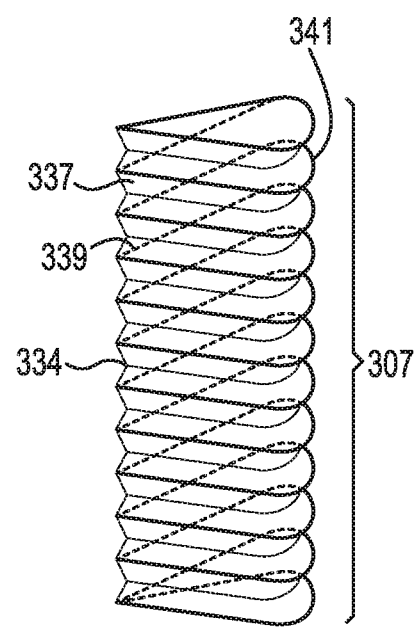
FIG. 3C illustrates a fully extended collapsible fairing having an outer ridge that spirals from top to bottom of the collapsible fairing.

FIG. 3C illustrates a fully extended collapsible fairing 334 having an outer ridge 341 that spirals from a top to a bottom, as illustrated in FIG. 3C, of the collapsible fairing 334. The outer ridge 341 is illustrated as a spiraling thick solid line in the foreground and as a dotted line in the background (for the portion of the outer ridge that would not be visible in this perspective). The outer ridge 341 can maintain a shape of the collapsible fairing 334, such as a foil shape. Respective upper sheets 337 and lower sheets 339 can couple adjacent spirals of the outer ridge 341. The upper sheets 337 and lower sheets 339 are indicated by the thin lines between the thick line of the outer ridge 341. The upper sheets 337 and lower sheets 339 can have a diameter that mirrors the shape of the collapsible fairing 334 and decreases as the respective upper sheets 337 and lower sheets 339 extend away from the adjacent spirals of the outer ridge 341. The upper sheets 337 can be coupled to the lower sheets 339 such that the upper sheets 337 and lower sheets 339 fold together as the collapsible fairing 334 collapses. The upper sheets 337 and the lower sheets 339 can be flexible or rigid. In at least one embodiment, the upper sheets 337 and lower sheets 339 can be portions of a unitary sheet, such as a single piece of material. In at least one embodiment, the upper sheets 337 and the lower sheets 339 can be discrete sheets.

In at least one embodiment, the outer ridge 341 can have a spring constant such that a reaction force is applied between the top and the bottom of the collapsible fairing 334. For example, as illustrated in FIG. 3C, the top of the collapsible fairing can be in contact with or coupled to a float and the bottom of the collapsible fairing can be in contact with or coupled to a towed object or an attachment point of a towed object. In such embodiments, a retraction force can be applied between the float and the towed object in response to the outer ridge 341 being extended beyond an equilibrium length and an extension force can be applied between the float and the towed object in response to the outer ridge 341 being collapsed beyond the equilibrium length. The equilibrium length can be between the fully collapsed length 305 and the fully extended length 307 of the collapsible fairing 334. The reaction force can help to prevent the collapsible fairing 334 from being over extended or over collapsed.

Figure 3D:
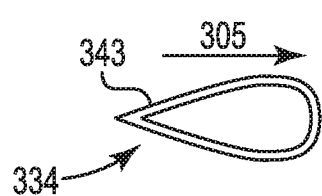
FIG. 3D illustrates a cross section of a collapsible fairing having a foil shape.

FIG. 3D illustrates a cross section of a collapsible fairing 334 having a foil shape 343. The foil shape 343 may also be referred to as a teardrop shape. The collapsible fairing 334 can be moving in a right-ward direction, as illustrated at 305, in a direction of travel of a marine survey vessel while pulled through water. A foil shape 343 can refer to a shape that has a lower coefficient of drag than a shape with a circular cross section. In at least one embodiment, the foil shape 343 can be symmetric with no camber. With respect to a foil, camber is the maximum distance between the mean camber line and the chord line, measured perpendicular to the chord line. The mean camber line is the locus of points halfway between the outer surfaces (upper and lower surfaces as illustrated in FIG. 3D) as measured perpendicular to the mean camber line itself. A mean camber line may be curved. The chord line is a straight line connecting the leading edge (the right most point of the outer surfaces in FIG. 3D) and the trailing edge (the point on the left where the outer surfaces connect in FIG. 3D). That a foil has no camber means that there is no distance between the mean camber line and the chord line (i.e., that the mean camber line and the chord line are collinear). Such a profile may be advantageous in both reducing drag and preventing or reducing lift in a direction perpendicular to the direction of travel 305 ("perpendicular to the direction of travel" being left or right with respect to the marine survey vessel, or up or down as illustrated in FIG. 3D). A coefficient of drag refers to a quantity associated with drag or resistance of an object in a fluid environment, such as air or water. This can allow for easier movement through the fluid and a decreased drag on the object. At least one embodiment of the present disclosure can reduce the drag coefficient from what would otherwise be approximately 1.5~2.3 down to between 0.40 and 0.55 using the collapsible fairing 334 over the line. For a system that includes 12 to 16 lines that add up to a total length of 360 or more meters, where each of the lines are 18 millimeters in diameter, drag can be reduced overall by a factor of approximately 5.

Figure 3E:
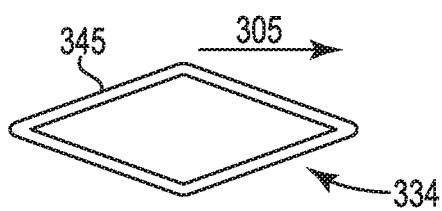
FIG. 3E illustrates a cross section of a collapsible fairing having a diamond shape.

FIG. 3E illustrates a cross section of a collapsible fairing 334 having a diamond shape 345. The collapsible fairing 334 can be moving in a right-ward direction, as illustrated at 305, in a direction of travel of a marine survey vessel while pulled through water. A vertex of the diamond shape 345 of the cross section of the collapsible fairing 334 having an acute internal angle can point toward the direction of travel 305. The vertex having the acute internal angle can be the leading edge of the collapsible fairing 334 while being pulled through water. In some instances, the collapsible fairing 334 may be easier or less expensive to manufacture with a diamond shape 345 cross section rather than a foil shape cross section.

Figure 4A:
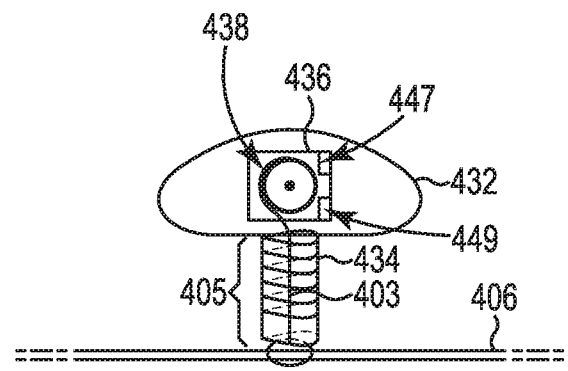
FIG. 4A illustrates a collapsible fairing system with a line at a first length.
Figure 4B:
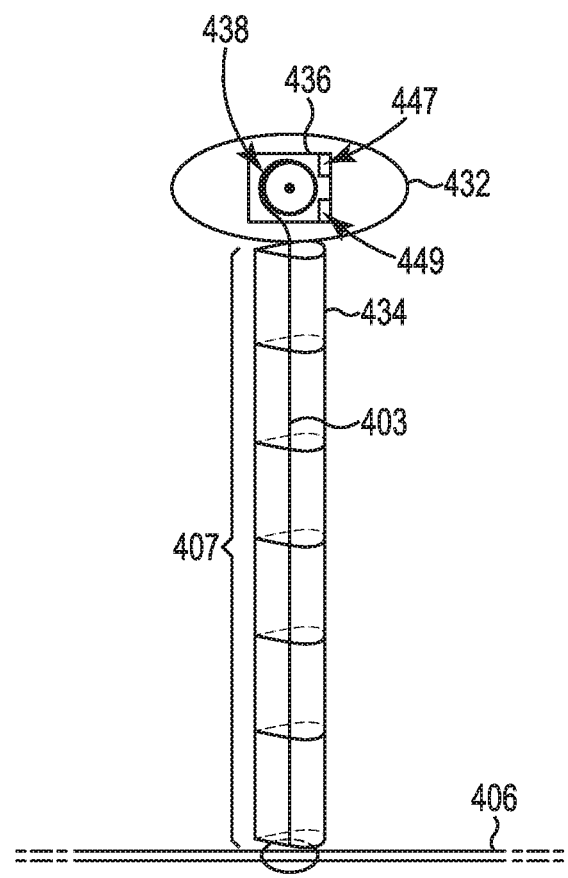
FIG. 4B illustrates a collapsible fairing system with a line at a second length.

FIG. 4A illustrates a collapsible fairing system with a line 403 at a first length. FIG. 4B illustrates a collapsible fairing system with a line at a second length. The system can include a float 432, a winch 436 coupled to the float 432, a line 403 associated with the winch 436, and a collapsible fairing 434 surrounding the line 403. The winch 436 is configured to extend and retract the line 403. Extension and retraction of the line 403 causes the collapsible fairing 434 to extend and collapse. A towed object 406 can be coupled to the line 403 such that the float 432 at least partially supports the towed object 406. The collapsible fairing 434 can surround the line between the float 432 and the towed object 406. The winch 436 can be configured to extend and retract the line 403 to lower and raise the towed object 406 between a first position (as illustrated in FIG. 4A) and a second position (as illustrated in FIG. 4B) that correspond to a fully extended length 407 and a fully collapsed length 405 of the collapsible fairing 434.

The winch 436 can include an electronic controller 447. The electronic controller 447 can control the operation of the winch 436, such as extending or retracting the line 403. The electronic controller 447 can be programmed with the first position of the towed object 406 or first length of the line 403 such that the winch 436 will not extend the line 403 too far, where the collapsible fairing 434 would otherwise be over extended. The electronic controller 447 can be programmed with the second position of the towed object 406 or second length of the line 403 such that the winch 436 will not retract the line 403 too far, where the collapsible fairing 434 would otherwise be over compressed or even wound onto the winch 436. In at least one embodiment, the electronic controller 447 or at least a portion of the functionality of the electronic controller 447 can be provided by a corresponding electronic controller associated with the onboard equipment of the marine survey vessel (e.g., electronic controller 101 associated with the onboard equipment 104 of the marine survey vessel 102 illustrated in FIG. 1). In at least one embodiment the winch 436 can include a sensor 449 configured to detect the position of the towed object 406 or a length of the line 403 that is extended. In the example where the position of the towed object 406 is detected, the length of the line 403 can be adjusted based on the detected position of the towed object 406. Information from the sensor 449 can be passed to the electronic controller 447 and/or the electronic controller associated with the onboard equipment of the marine survey vessel. The winch 436 can include or be coupled to a transceiver for wireless communication with the electronic controller associated with the onboard equipment of the marine survey vessel. Such communication between the winch 436 and the marine survey vessel can be provided in a wired fashion in at least one embodiment.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of towing a towed object with a marine survey vessel, comprising:
   towing a towed object with a marine survey vessel, wherein the towed object is at least partially supported by a float; and
   extending a line from the float via a winch coupled to the float, wherein the line is surrounded by a collapsible fairing extending between the float and the towed object both before and after the line is extended;
   wherein extending the line causes the collapsible fairing to extend away from a water surface.

2. The method of claim 1, wherein extending the line comprises extending the line from a first length corresponding to a fully collapsed length of the collapsible fairing to a second length corresponding to a fully extended length of the collapsible fairing.

3. The method of claim 1, wherein extending the line comprises extending the line from a fully collapsed length of the collapsible fairing to a length between the fully collapsed length and a fully extended length of the collapsible fairing.

4. The method of claim 1, wherein the line is extended away from the water surface in a direction non-parallel to a direction of travel of the marine survey vessel.

5. The method of claim 1, wherein extending the line comprises extending the line without adding additional sections to the collapsible fairing.

6. The method of claim 1, wherein towing the towed object comprises towing one of a group of towed objects including a streamer, a source, and a receiver.

7. The method of claim 1, wherein the collapsible fairing remains positioned between the float and the towed object before, during, and after extension of the line.

8. The method of claim 1, wherein the collapsible fairing remains positioned between the float and the towed object before, during, and after extension of the line.

9. A method of towing a towed object with a marine survey vessel, comprising:
   towing a towed object with a marine survey vessel, wherein the towed object is at least partially supported by a float; and
   retracting a line from the float via a winch coupled to the float, wherein the line is surrounded by a collapsible fairing extending between the float and the towed object both before and after the line is retracted;
   wherein retracting the line causes the collapsible fairing to retract toward a water surface.

10. The method of claim 9, wherein retracting the line comprises retracting the line from a second length corresponding to a fully extended length of the collapsible fairing to a first length corresponding to a fully collapsed length of the collapsible fairing.

11. The method of claim 10, wherein retracting the line comprises wirelessly controlling, via an electronic controller, the retraction of the line to the first length.

12. The method of claim 9, wherein retracting the line comprises retracting the line from a fully extended length of the collapsible fairing to a length between the fully extended length and a fully collapsed length of the collapsible fairing.

13. The method of claim 9, wherein retracting the line comprises retracting the line without removing sections of fairing.

14. The method of claim 9, further comprising detecting a position of the towed object and adjusting a length of the line based on the detected position.

15. A method of towing a towed object with a marine survey vessel, comprising:
   towing a towed object with a marine survey vessel, wherein the towed object is at least partially supported by a float; and
   extending a line from the float via a winch coupled to the float, wherein the line is surrounded by a collapsible fairing extending between the float and the towed object both before and after the line is extended;
   wherein extending the line comprises moving the towed object further from a water surface in a direction non-parallel to a direction of travel of the marine survey vessel.

16. The method of claim 15, wherein extending the line comprises extending the line from a first length corresponding to a fully collapsed length of the collapsible fairing to a second length corresponding to a fully extended length of the collapsible fairing.

17. The method of claim 15, wherein extending the line comprises extending the line from a fully collapsed length of the collapsible fairing to a length between the fully collapsed length and a fully extended length of the collapsible fairing.

18. The method of claim 15, wherein extending the line comprises extending the line without adding additional sections to the collapsible fairing.

* * * * *